United States Patent
Ndamka et al.

(10) Patent No.: US 11,655,543 B2
(45) Date of Patent: May 23, 2023

(54) CMAS-RESISTANT BARRIER COATINGS

(71) Applicants: Rolls-Royce Corporation, Indianapolis, IN (US); Rolls-Royce North American Technologies, Inc., Indianapolis, IN (US); Rolls-Royce PLC, London (GB)

(72) Inventors: Ngunjoh Lawrence Ndamka, Derby (GB); Li Li, Carmel, IN (US); Ann Bolcavage, Indianapolis, IN (US); Bruce Edward Varney, Greenwood, IN (US); Sean E. Landwehr, Avon, IN (US)

(73) Assignees: ROLLS-ROYCE CORPORATION, Indianapolis, IN (US); ROLLS-ROYCE PLC, London (GB); ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 1324 days.

(21) Appl. No.: 16/057,984

(22) Filed: Aug. 8, 2018

(65) Prior Publication Data

US 2019/0048475 A1 Feb. 14, 2019

Related U.S. Application Data

(60) Provisional application No. 62/542,550, filed on Aug. 8, 2017.

(51) Int. Cl.
*C23C 28/04* (2006.01)
*F01D 5/28* (2006.01)
*C23C 28/00* (2006.01)

(52) U.S. Cl.
CPC .......... *C23C 28/042* (2013.01); *C23C 28/321* (2013.01); *C23C 28/3215* (2013.01); *C23C 28/345* (2013.01); *C23C 28/347* (2013.01); *C23C 28/3455* (2013.01); *F01D 5/288* (2013.01); *F05D 2220/323* (2013.01); *F05D 2240/12* (2013.01); *F05D 2240/30* (2013.01); *F05D 2300/21* (2013.01); *F05D 2300/611* (2013.01)

(58) Field of Classification Search
None
See application file for complete search history.

(56) References Cited

U.S. PATENT DOCUMENTS

| | | |
|---|---|---|
| 3,962,059 A | 6/1976 | Kaup et al. |
| 3,964,877 A | 6/1976 | Bessen et al. |
| 4,094,673 A | 6/1978 | Erickson et al. |
| 4,386,968 A | 6/1983 | Hinkel et al. |
| 4,588,607 A | 5/1986 | Matarese et al. |
| 4,663,250 A | 5/1987 | Ong et al. |
| 4,914,794 A | 4/1990 | Strangman |
| 4,996,117 A | 2/1991 | Chu et al. |
| 5,320,909 A | 6/1994 | Scharman et al. |
| 5,350,599 A | 9/1994 | Rigney et al. |
| 5,391,404 A | 2/1995 | Lee et al. |
| 5,496,644 A | 3/1996 | Lee et al. |
| 5,660,885 A | 8/1997 | Hasz et al. |
| 5,704,759 A | 1/1998 | Draskovich et al. |
| 5,714,202 A | 2/1998 | Lemelson et al. |
| 5,773,141 A | 6/1998 | Hasz et al. |
| 5,851,678 A | 12/1998 | Hasz et al. |
| 5,869,146 A | 2/1999 | McCluskey et al. |
| 5,871,820 A | 2/1999 | Hasz et al. |
| 5,876,850 A | 3/1999 | Skowronski et al. |
| 5,876,860 A | 3/1999 | Marijnissen et al. |
| 5,914,189 A | 6/1999 | Hasz et al. |
| 5,985,470 A | 11/1999 | Spitsberg et al. |
| 6,057,047 A | 5/2000 | Maloney |
| 6,071,628 A | 6/2000 | Seals et al. |
| 6,261,643 B1 | 7/2001 | Hasz et al. |
| 6,284,325 B1 | 9/2001 | Eaton, Jr. et al. |

(Continued)

FOREIGN PATENT DOCUMENTS

| | | |
|---|---|---|
| CA | 2712248 A1 | 7/2009 |
| EP | 0972853 A1 | 1/2000 |

(Continued)

OTHER PUBLICATIONS

Krause, 2ZrO2.Y2O3 Thermal Barrier Coatings Resistant to Degradation by Molten CMAS: Part I, Optical Basicity Considerations and Processing, J. Am. Cheram. Soc., 97 [12], (2014), p. 3943-3949 (Year: 2014).*

Ndamka, Microstructural Damage of Thermal Barrier Coatings Due to CMAS Attack, Thesis, School of Applied Sciences Surface Engineering and Nanotechnology Institute, Cranfield University, 2013, p. 1-300 (Year: 2013).*

Krause 2, 2ZrO2.Y2O3 Thermal Barrier Coatings Resistant to Degradation by Molten CMAS: Part II, Interactions with Sand and Fly Ash, J. Am. Ceram. Soc., 97 [12], (2014), p. 3950-3957 (Year: 2014).*

"Coating Technology for the Future," Directed Vapor Technologies International, Inc., retrieved from http://www.directedvapor.com/Capabilities_Brochure.pdf on Dec. 9, 2013, 7 pp.

(Continued)

*Primary Examiner* — Tabatha L Penny
(74) *Attorney, Agent, or Firm* — Shumaker & Sieffert, P.A

(57) ABSTRACT

A method includes predicting a composition of calcium-magnesium-aluminum-silicate (CMAS) to be encountered by a high temperature mechanical system during use of the high temperature mechanical system. The method further includes selecting a composition of a CMAS-resistant barrier coating layer based at least in part on the predicted composition of CMAS. The CMAS-resistant barrier coating layer includes a base composition and at least one secondary oxide selected based on the predicted composition of CMAS. The at least one secondary oxide includes at least one of an oxide of a divalent element, an oxide of a trivalent element, or an oxide of a tetravalent element. The CMAS-resistant barrier coating layer comprises greater than 0 mol. % and less than about 7 mol. % of the at least one secondary oxide.

13 Claims, 3 Drawing Sheets

(56) References Cited

U.S. PATENT DOCUMENTS

| | | |
|---|---|---|
| 6,296,942 B1 | 10/2001 | Eaton et al. |
| 6,299,988 B1 | 10/2001 | Wang et al. |
| 6,312,763 B1 | 11/2001 | Eaton, Jr. et al. |
| 6,410,148 B1 | 6/2002 | Eaton, Jr. et al. |
| 6,465,090 B1 | 10/2002 | Stowell et al. |
| 6,468,648 B1 | 10/2002 | McCluskey et al. |
| 6,485,848 B1 | 11/2002 | Wang et al. |
| 6,562,409 B2 | 5/2003 | Koshkarian et al. |
| 6,587,534 B2 | 7/2003 | Hassoun et al. |
| 6,613,445 B2 | 9/2003 | Sangeeta et al. |
| 6,617,036 B2 | 9/2003 | Eaton et al. |
| 6,617,037 B2 | 9/2003 | Sun et al. |
| 6,627,323 B2 | 9/2003 | Nagaraj et al. |
| 6,645,649 B2 | 11/2003 | Tanaka et al. |
| 6,720,038 B2 | 4/2004 | Darolia et al. |
| 6,723,674 B2 | 4/2004 | Wang et al. |
| 6,733,908 B1 | 5/2004 | Lee et al. |
| 6,759,151 B1 | 7/2004 | Lee |
| 6,787,195 B2 | 9/2004 | Wang et al. |
| 6,812,176 B1 | 11/2004 | Zhu et al. |
| 6,835,465 B2 | 12/2004 | Allen et al. |
| 6,849,334 B2 | 2/2005 | Horne et al. |
| 6,869,508 B2 | 3/2005 | Darolia et al. |
| 6,887,528 B2 | 5/2005 | Lau et al. |
| 6,887,595 B1 | 5/2005 | Darolia et al. |
| 6,890,668 B2 | 5/2005 | Bruce et al. |
| 6,893,750 B2 | 5/2005 | Nagaraj et al. |
| 6,902,662 B2 | 6/2005 | Eaton et al. |
| 6,902,836 B2 | 6/2005 | Eaton et al. |
| 6,903,162 B2 | 6/2005 | Nygard et al. |
| 6,933,061 B2 | 8/2005 | Nagaraj et al. |
| 6,933,066 B2 | 8/2005 | Nagaraj et al. |
| 6,960,395 B2 | 11/2005 | Spitsberg et al. |
| 6,969,555 B2 | 11/2005 | Meschter et al. |
| 7,008,674 B2 | 3/2006 | Nagaraj et al. |
| 7,063,894 B2 | 6/2006 | Sun et al. |
| 7,090,894 B2 | 8/2006 | Carper et al. |
| 7,186,466 B2 | 3/2007 | Zhu et al. |
| 7,226,668 B2 | 6/2007 | Nagaraj et al. |
| 7,247,393 B2 | 7/2007 | Hazel et al. |
| 7,291,408 B2 | 11/2007 | Litton et al. |
| 7,306,860 B2 | 12/2007 | Strangman et al. |
| 7,354,651 B2 | 4/2008 | Hazel et al. |
| 7,357,994 B2 | 4/2008 | Hazel et al. |
| 7,364,802 B2 | 4/2008 | Spitsberg et al. |
| 7,374,818 B2 | 5/2008 | Bhatia et al. |
| 7,374,825 B2 | 5/2008 | Hazel et al. |
| 7,422,671 B2 | 9/2008 | Bhatia et al. |
| 7,442,444 B2 | 10/2008 | Hazel et al. |
| 7,449,254 B2 | 11/2008 | Spitsberg et al. |
| 7,510,777 B2 | 3/2009 | Darolia et al. |
| 7,510,785 B2 | 3/2009 | Fukudome et al. |
| 7,544,394 B2 | 6/2009 | Boutwell et al. |
| 7,579,085 B2 | 8/2009 | Hazel |
| 7,595,114 B2 | 9/2009 | Meschter et al. |
| 7,666,512 B2 | 2/2010 | Bhatia et al. |
| 7,695,830 B2 | 4/2010 | Strangman et al. |
| 7,740,960 B1 | 6/2010 | Zhu et al. |
| 7,780,832 B2 | 8/2010 | Hasz |
| 7,824,744 B2 | 11/2010 | Darolia et al. |
| 7,858,212 B2 | 12/2010 | Schlichting et al. |
| 7,862,901 B2 | 1/2011 | Darolia et al. |
| 7,867,575 B2 | 1/2011 | Boutwell et al. |
| 7,879,411 B2 | 2/2011 | Hass et al. |
| 7,927,722 B2 | 4/2011 | Schlichting et al. |
| 7,951,459 B2 | 5/2011 | Tang et al. |
| 7,968,217 B2 | 6/2011 | Sarrafi-Nour et al. |
| 7,981,530 B2 | 7/2011 | Sporer et al. |
| 7,994,022 B2 | 8/2011 | Kakehata |
| 8,017,062 B2 | 9/2011 | Narendar et al. |
| 8,034,153 B2 | 10/2011 | Marchiando et al. |
| 8,039,113 B2 | 10/2011 | Kirby et al. |
| 8,062,759 B2 | 11/2011 | Fu et al. |
| 8,084,086 B2 | 12/2011 | Hass et al. |
| 8,119,247 B2 | 2/2012 | Kirby et al. |
| 8,124,252 B2 | 2/2012 | Cybulsky et al. |
| 8,216,689 B2 | 7/2012 | Witz et al. |
| 8,273,231 B2 | 9/2012 | Creech |
| 8,470,460 B2 | 6/2013 | Lee |
| 8,501,840 B2 | 8/2013 | Kirby et al. |
| 8,586,169 B2 | 11/2013 | Namba et al. |
| 8,658,255 B2 | 2/2014 | Kirby et al. |
| 8,722,270 B2 | 5/2014 | Pastula et al. |
| 8,940,417 B2 | 1/2015 | Courcot et al. |
| 8,999,457 B2 | 4/2015 | Kirby et al. |
| 9,005,716 B2 | 4/2015 | Kirby et al. |
| 9,005,717 B2 | 4/2015 | Kirby et al. |
| 9,023,435 B2 | 5/2015 | Kirby et al. |
| 9,056,802 B2 | 6/2015 | Kirby et al. |
| 9,062,564 B2 | 6/2015 | Kirby et al. |
| 9,133,541 B2 | 9/2015 | Lee |
| 9,194,242 B2 | 11/2015 | Lee |
| 9,212,100 B2 | 12/2015 | Kirby et al. |
| 10,233,760 B2 | 3/2019 | Lee |
| 2001/0033630 A1 | 10/2001 | Hassoun et al. |
| 2002/0098391 A1 | 7/2002 | Tanaka et al. |
| 2003/0113553 A1 | 6/2003 | Sun et al. |
| 2003/0113559 A1 | 6/2003 | Eaton et al. |
| 2003/0118841 A1 | 6/2003 | Horne et al. |
| 2003/0138658 A1 | 7/2003 | Taylor et al. |
| 2004/0038085 A1 | 2/2004 | Litton et al. |
| 2004/0043244 A1 | 3/2004 | Bruce et al. |
| 2004/0115351 A1 | 6/2004 | Lau et al. |
| 2004/0151840 A1 | 8/2004 | Wang et al. |
| 2004/0156724 A1 | 8/2004 | Torigoe et al. |
| 2004/0170849 A1 | 9/2004 | Ackerman et al. |
| 2005/0003172 A1 | 1/2005 | Wheeler et al. |
| 2005/0003175 A1 | 1/2005 | Wheeler et al. |
| 2005/0126494 A1 | 6/2005 | Darolia et al. |
| 2005/0129511 A1 | 6/2005 | Allen |
| 2005/0129973 A1 | 6/2005 | Eaton et al. |
| 2005/0142392 A1 | 6/2005 | Spitsberg et al. |
| 2005/0164027 A1 | 7/2005 | Lau et al. |
| 2005/0255648 A1 | 11/2005 | Bhatia et al. |
| 2006/0014029 A1 | 1/2006 | Saak et al. |
| 2006/0024513 A1 | 2/2006 | Schlichting et al. |
| 2006/0024527 A1 | 2/2006 | Schlichting et al. |
| 2006/0024528 A1 | 2/2006 | Strangman et al. |
| 2006/0029733 A1 | 2/2006 | Bhatia et al. |
| 2006/0046450 A1 | 3/2006 | Narendar et al. |
| 2006/0073361 A1 | 4/2006 | Fukudome et al. |
| 2006/0078750 A1 | 4/2006 | Zhu et al. |
| 2006/0115659 A1 | 6/2006 | Hazel et al. |
| 2006/0115661 A1 | 6/2006 | Hazel et al. |
| 2006/0154093 A1 | 7/2006 | Meschter et al. |
| 2006/0166018 A1 | 7/2006 | Spitsberg et al. |
| 2006/0210800 A1 | 9/2006 | Spitsberg et al. |
| 2006/0211241 A1 | 9/2006 | Govern et al. |
| 2006/0280952 A1 | 12/2006 | Hazel et al. |
| 2006/0280953 A1 | 12/2006 | Hazel et al. |
| 2006/0280954 A1* | 12/2006 | Spitsberg ............ C04B 41/009 427/372.2 |
| 2006/0280955 A1 | 12/2006 | Spitsberg et al. |
| 2006/0280963 A1 | 12/2006 | Hazel et al. |
| 2007/0014996 A1 | 1/2007 | Bhatia et al. |
| 2007/0071996 A1 | 3/2007 | Hazel et al. |
| 2007/0082131 A1 | 4/2007 | Doesberg et al. |
| 2007/0119713 A1 | 5/2007 | Hasz |
| 2007/0141367 A1 | 6/2007 | Darolia et al. |
| 2007/0160859 A1 | 7/2007 | Darolia et al. |
| 2007/0184204 A1 | 8/2007 | Balagopal et al. |
| 2007/0207330 A1 | 9/2007 | Tulyani et al. |
| 2007/0224411 A1 | 9/2007 | Hazel et al. |
| 2007/0227299 A1 | 10/2007 | Marchiando et al. |
| 2008/0124479 A1 | 5/2008 | Hazel et al. |
| 2008/0145674 A1 | 6/2008 | Darolia et al. |
| 2008/0206542 A1 | 8/2008 | Vance et al. |
| 2008/0274336 A1 | 11/2008 | Merrill et al. |
| 2009/0004427 A1 | 1/2009 | Sarrafi-Nour et al. |
| 2009/0061530 A1 | 3/2009 | Bossmann et al. |
| 2009/0102008 A1 | 4/2009 | Kakehata |
| 2009/0110953 A1 | 4/2009 | Margolies |
| 2009/0155554 A1 | 6/2009 | Gentleman et al. |
| 2009/0162539 A1 | 6/2009 | Boutwell et al. |

(56) References Cited

U.S. PATENT DOCUMENTS

| | | |
|---|---|---|
| 2009/0162556 A1 | 6/2009 | Boutwell et al. |
| 2009/0162684 A1 | 6/2009 | Creech |
| 2009/0169914 A1 | 7/2009 | Fu et al. |
| 2009/0176059 A1 | 7/2009 | Namba et al. |
| 2009/0178413 A1 | 7/2009 | Lee |
| 2009/0184280 A1 | 7/2009 | Lee |
| 2009/0186237 A1 | 7/2009 | Lee |
| 2009/0297866 A1 | 12/2009 | Raybould et al. |
| 2009/0324930 A1 | 12/2009 | Tulyani et al. |
| 2010/0080984 A1 | 4/2010 | Lee |
| 2010/0129636 A1 | 5/2010 | Cybulsky et al. |
| 2010/0136349 A1* | 6/2010 | Lee .................. C04B 41/52 428/411.1 |
| 2010/0159150 A1 | 6/2010 | Kirby et al. |
| 2010/0159253 A1 | 6/2010 | Kirby et al. |
| 2011/0027467 A1 | 2/2011 | Kirby et al. |
| 2011/0027469 A1 | 2/2011 | Kirby et al. |
| 2011/0027470 A1 | 2/2011 | Kirby et al. |
| 2011/0027476 A1 | 2/2011 | Kirby et al. |
| 2011/0027484 A1 | 2/2011 | Kirby et al. |
| 2011/0027517 A1 | 2/2011 | Kirby et al. |
| 2011/0027557 A1 | 2/2011 | Kirby et al. |
| 2011/0027558 A1 | 2/2011 | Kirby et al. |
| 2011/0027559 A1 | 2/2011 | Kirby et al. |
| 2011/0027578 A1 | 2/2011 | Kirby et al. |
| 2011/0033630 A1 | 2/2011 | Naik et al. |
| 2011/0111310 A1 | 5/2011 | Pastula et al. |
| 2011/0256411 A1 | 10/2011 | Courcot et al. |
| 2012/0076943 A1 | 3/2012 | Kirby et al. |
| 2012/0077004 A1 | 3/2012 | Kirby et al. |
| 2012/0128879 A1 | 5/2012 | Cybulsky et al. |
| 2012/0244383 A1 | 9/2012 | Meschter et al. |
| 2013/0011578 A1 | 1/2013 | Hass et al. |
| 2013/0136915 A1 | 5/2013 | Naik |
| 2013/0189531 A1 | 7/2013 | Lee |
| 2013/0224457 A1 | 8/2013 | Lee |
| 2014/0065438 A1 | 3/2014 | Lee |
| 2014/0072816 A1 | 3/2014 | Lee |
| 2014/0199163 A1 | 7/2014 | Lee |
| 2014/0255680 A1 | 9/2014 | Lee et al. |
| 2014/0272197 A1 | 9/2014 | Lee |
| 2015/0159507 A1 | 6/2015 | Sivaramakrishnan et al. |
| 2015/0267058 A1 | 9/2015 | Lee |
| 2016/0362557 A1 | 12/2016 | Lee |
| 2017/0044930 A1 | 2/2017 | Luthra et al. |
| 2018/0282851 A1 | 10/2018 | Ndamka et al. |
| 2018/0370862 A1 | 12/2018 | Kirby et al. |
| 2019/0153880 A1 | 5/2019 | Lee |

FOREIGN PATENT DOCUMENTS

| | | |
|---|---|---|
| EP | 1335040 A2 | 8/2003 |
| EP | 1400611 A1 | 3/2004 |
| EP | 1428902 A1 | 6/2004 |
| EP | 1479661 A2 | 11/2004 |
| EP | 1550642 A2 | 7/2005 |
| EP | 1626039 A2 | 2/2006 |
| EP | 1666638 A1 | 6/2006 |
| EP | 1795515 A2 | 6/2007 |
| EP | 1806435 A3 | 8/2007 |
| EP | 1829847 A2 | 9/2007 |
| EP | 1975258 A1 | 10/2008 |
| EP | 2108715 A2 | 10/2009 |
| EP | 2189504 A1 | 5/2010 |
| EP | 2192098 A2 | 6/2010 |
| EP | 2194164 A1 | 6/2010 |
| EP | 2208805 A1 | 7/2010 |
| EP | 2245096 A2 | 11/2010 |
| EP | 2287131 A2 | 2/2011 |
| EP | 2287134 A2 | 2/2011 |
| EP | 2287138 A2 | 2/2011 |
| EP | 2468918 A2 | 6/2012 |
| GB | 2319248 A | 5/1998 |
| SG | 163216 | 3/2013 |
| WO | 2006023894 A2 | 3/2006 |
| WO | 2007098152 A1 | 8/2007 |
| WO | 2007116547 A2 | 10/2007 |
| WO | 2008103163 A2 | 8/2008 |
| WO | 2008109214 A2 | 9/2008 |
| WO | 2009091721 A2 | 7/2009 |
| WO | 2009091724 A1 | 7/2009 |
| WO | 2010039699 A3 | 4/2010 |
| WO | 2011085109 A1 | 7/2011 |
| WO | 2011085376 A1 | 7/2011 |
| WO | 2011123432 A1 | 10/2011 |
| WO | 2012012431 A1 | 1/2012 |
| WO | 2012027442 A1 | 3/2012 |
| WO | 2012122373 A1 | 9/2012 |
| WO | 2012129431 A1 | 9/2012 |

OTHER PUBLICATIONS

Anderson et al., "Ultrasonic Measurement of the Kearns Texture Factors in Zircaloy, Zirconium, and Titanium," vol. 30A, Aug. 1999, Metallurgical and Materials Transactions, 8 pp.

Grant et al., "CMAS degradation of environmental barrier coatings," Surface and Coatings Technology, vol. 202, Jul. 4, 2007, 5 pp.

Harder et al., "Chemical and Mechanical Consequences of Environmental Barrier Coating Exposure to Calcium-Magnesium-Aluminosilicate," Journal of the American Ceramic Society, vol. 94, No. S1, Mar. 17, 2011, 8 pp.

Kramer et al., "Thermochemical Interaction of Thermal Barrier Coatings with Molten CaO—MgO—Al2O3—SiO2 (CMAS) Deposits," Journal of the American Ceramic Society, vol. 89, No. 10, Aug. 9, 2006, 9 pp.

Lee et al., "Rare earth silicate environmental barrier coatings for SiC/SiC composites and Si3N4 ceramics," Journal of the European Ceramic Society, vol. 25, Jan. 21, 2005.

Ndamka, "Microstructural Damage of Thermal Barrier Coating Due to CMAS Attack," Cranfield University, School of Applied Sciences Surface Engineering and Nanotechnology Institute (SENTI), Oct. 2013, pp. 332.

Shelby et al., "Rare earth aluminosilicate glasses," Journal of American Ceramic Society, vol. 73, No. 1, Jan. 1990, 4 pp.

U.S. Appl. No. 61/318,567, filed Mar. 29, 2010.

U.S. Appl. No. 15/943,250, filed Apr. 2, 2018, by Ndamka et al.

Bhattacharya et al., "Calcia-Doped Yttria Stabilized Zirconia for Thermal Barrier Coatings: Synthesis and Characterization," Journal of Materials Science, vol. 46, Sep. 2011, pp. 5709-5714.

* cited by examiner

CMAS-RESISTANT BARRIER COATINGS

This application claims the benefit of U.S. Provisional Application Ser. No. 62/542,550, filed Aug. 8, 2017, which is incorporated herein by reference in its entirety.

TECHNICAL FIELD

The disclosure relates to barrier coatings for high temperature mechanical systems.

BACKGROUND

Components of high-temperature mechanical systems, such as gas-turbine engines, must operate in severe environments. For example, the high-pressure turbine blades and vanes exposed to hot gases in commercial aeronautical engines typically experience metal surface temperatures of about 1000° C., with short-term peaks as high as 1100° C. Some components of high-temperature mechanical systems include a Ni or Co-based superalloy substrate coated with a thermal barrier coating (TBC). The thermal barrier coating may include a thermally insulative ceramic topcoat and is bonded to the substrate by an underlying metallic bond coat. The TBC may include a layer of yttria-stabilized zirconia (YSZ) with a thickness of about 100-500 µm. The properties of YSZ include low thermal conductivity, high oxygen permeability, and a relatively high coefficient of thermal expansion. The TBC also may be made "strain tolerant" and the thermal conductivity further lowered by depositing a structure that contains numerous pores and/or pathways.

The desire for improved efficiency and reduced emissions, continue to drive the development of advanced gas turbine engines with higher inlet temperatures. Some components of high-temperature mechanical systems include a ceramic or ceramic matrix composite (CMC)-based substrate, which may allow an increased operating temperature compared to a component with a superalloy substrate. The CMC-based substrate can be coated with an environmental barrier coating (EBC) to reduce exposure of a surface of the substrate to environmental species, such as water vapor or oxygen. The EBC also may provide some thermal insulation to the CMC-based substrate. The EBC may include a ceramic topcoat, and may be bonded to the substrate by an underlying metallic or ceramic bond coat.

SUMMARY

In general, the disclosure is directed to a coating having CMAS-resistance. CMAS is a calcium-magnesium-aluminum-silicate deposit resulting from the ingestion of siliceous minerals (dust, sand, volcanic ashes, runway debris, and the like) with the intake of air in gas turbine engines.

In some examples, a method includes predicting a composition of calcium-magnesium-aluminum-silicate (CMAS) to be encountered by a high temperature mechanical system during use of the high temperature mechanical system. The method further includes selecting a composition of a CMAS-resistant barrier coating layer based at least in part on the predicted composition of CMAS. The CMAS-resistant barrier coating layer includes a base composition and at least one secondary oxide selected based on the predicted composition of CMAS. The at least one secondary oxide includes at least one of an oxide of a divalent element, an oxide of a trivalent element, or an oxide of a tetravalent element. The CMAS-resistant barrier coating layer comprises greater than 0 mol. % and less than about 7 mol. % of the at least one secondary oxide.

In some examples, an article includes a substrate and a calcium-magnesium-aluminum-silicate-resistant (CMAS-resistant) barrier coating layer overlying the substrate. The CMAS-resistant barrier coating layer includes a base composition and at least one secondary oxide selected based on the predicted composition of CMAS. The at least one secondary oxide comprises at least one of an oxide of a divalent element, an oxide of a trivalent element, or an oxide of a tetravalent element. The CMAS-resistant barrier coating layer comprises greater than 0 mol. % and less than about 7 mol. % of the at least one secondary oxide.

The details of one or more examples are set forth in the accompanying drawings and the description below. Other features, objects, and advantages of the disclosure will be apparent from the description and drawings, and from the claims.

DETAILED DESCRIPTION

Figure 1:
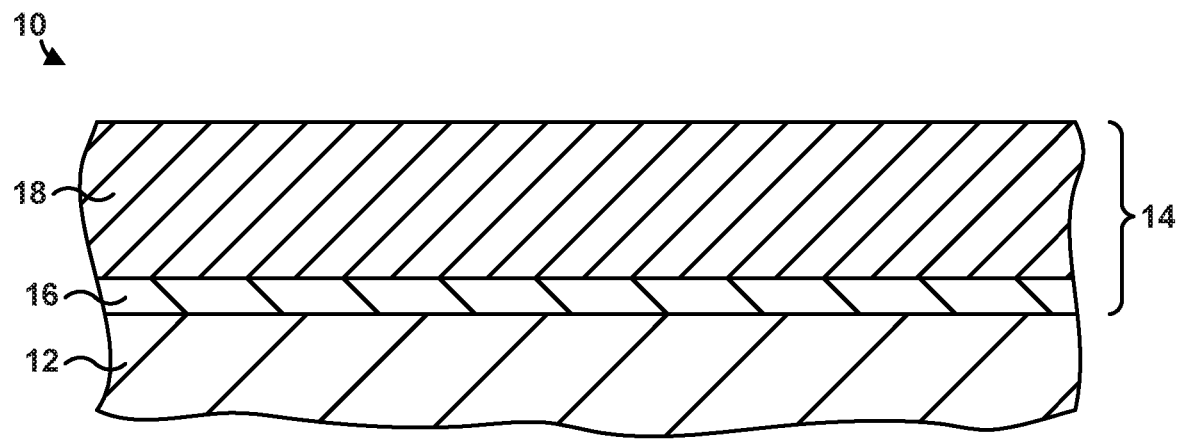
FIG. 1 is a cross-sectional diagram of an example of an article that includes a substrate coated with a barrier coating including a bond layer and a CMAS-resistant barrier coating layer.

In general, the disclosure is directed to coatings that possess resistance to calcium-magnesium-aluminum-silicate (CMAS) degradation, and articles coated with such coatings.

Increased operating efficiency (e.g., fuel efficiency) is continually sought after to reduce operating costs of gas turbine engines. Operating the gas turbine engines at higher temperatures is one technique of improving operating efficiency of the engine. As turbine inlet temperatures continue to increase, new barrier coatings, such as thermal barrier coatings (TBCs) or environmental barrier coatings (EBCs), are required that are able to withstand the high temperature to which the components of the gas turbine engine are exposed. As described briefly above, TBCs are typically deposited as a porous or columnar structure, which increases the stress tolerance and reduces the thermal conductivity of the TBC compared to a non-porous TBC. However, this porous TBC structure is susceptible to damage.

Higher turbine inlet temperatures may lead to damage of the TBC when a CMAS deposit forms on the TBC from the ingestion of siliceous minerals (dust, sand, volcanic ashes, runway debris, and the like) with the intake of air in gas turbine engines. Many CMAS deposits have a melting temperature of about 1200° C. to about 1450° C. (about 2200° F. to about 2650° F.), depending on composition of the CMAS. Advanced gas turbine engines run at TBC surface temperatures above the CMAS melting temperature, so the CMAS may be molten on the surface of the TBC, which allows the CMAS to infiltrate the pores of the porous TBC. When the component coated with the TBC is cooled below the CMAS melting temperature, the CMAS solidifies, which exerts a mechanical strain on the TBC and may reduce the useful life of the TBC. The filling of the pores of the TBC with molten CMAS may also increase the thermal conductivity of the TBC, which is detrimental to the TBC performance and may cause the substrate of the component to be exposed to increased temperatures.

Additionally, in examples in which a TBC includes yttria-stabilized zirconia (YSZ), the molten CMAS may dissolve the TBC along grain boundaries of the YSZ, and, depending on the melt chemistry, zirconia with lower yttria content may precipitate out of the molten solution. This zirconia with lower yttria content may decrease the effectiveness of the TBC compared to a TBC including zirconia and a higher yttria content.

Similar problems may occur in an article coated with an EBC. In some examples, at least a portion of an EBC (e.g., a sub-layer of the EBC) may be deposited on a substrate as a columnar or porous layer, and the cracks or pores may permit ingress of molten CMAS at sufficiently high operating temperatures. As described above, when CMAS cools below its melting temperature and hardens, this may exert a mechanical strain on the EBC and result in breaking of the EBC or spallation of the EBC from the substrate. Spallation of the EBC from the substrate exposes the substrate to attack by water vapor or other environmental species, which may result in recession of the substrate.

In some examples, molten CMAS may penetrate through an EBC or a TBC and may contact a bond layer or a substrate of the article. The CMAS may chemically react with the bond layer and/or substrate and may degrade the bond layer and/or substrate.

In accordance with examples of the disclosure, a barrier coating may include a CMAS-resistant barrier coating layer that protects at least one of a substrate or an underlying layer of an article from CMAS degradation. In general, the CMAS-resistant barrier coating layer may provide the barrier coating with increased resistance to the detrimental effects of CMAS. The CMAS-resistant barrier coating layer may include a base composition and at least one secondary oxide. The base composition may be selected to provide a desired type of protection to the substrate, such as thermal or environmental protection. The at least one secondary oxide may be selected based on a predicted composition of CMAS. The at least one secondary oxide includes at least one of an oxide of a divalent element, an oxide of a trivalent element, or an oxide of a tetravalent element. The CMAS-resistant barrier coating layer may include greater than 0 mol. % and less than about 7 mol. % of the at least one secondary oxide.

While not wishing to be bound by any particular theory, CMAS degradation of a barrier coating may be related to activity of particular active components of the CMAS and a basicity of the active components. Basicity may indicate a relative concentration of active components in the CMAS. Active components such as silica or other oxides of tetravalent elements may contribute to a low basicity of CMAS, while active components such as calcia or other oxides of divalent elements may contribute to a high basicity of CMAS. As an example, CMAS having a low basicity, such as CMAS with a high silica concentration, may degrade barrier coatings through diffusion of silica from the CMAS melt into the barrier coating and reaction of the silica with base components of the barrier coating, leading to depletion of stabilizing dopants and subsequent destabilization of the base components. As another example, CMAS having a high basicity, such as CMAS with a high calcia concentration, may degrade barrier coatings by diffusion of calcia from the CMAS melt into the barrier coating and reaction of the calcia with the base components of the barrier coating.

In some examples, a composition of CMAS to be encountered by a high temperature mechanical system during use of the high temperature mechanical system may be predicted. For example, a basicity index for a known or anticipated CMAS composition may be calculated or referenced based on geographical region of intended use for the high temperature mechanical system. The predicted basicity index may indicate relative concentrations of oxides of divalent elements, oxides of trivalent elements, or oxides of tetravalent elements. Oxides of divalent elements, such as CaO, may act as basic oxides; oxides of tetravalent elements, such as $SiO_2$, may act as acidic oxides; and oxides of trivalent elements, such as $Al_2O_3$, may act as amphoteric oxides, which may act as either acidic or basic oxides in different environments. A composition of a CMAS-resistant barrier coating layer may be selected based at least in part on the predicted composition of CMAS. The composition of the CMAS-resistant barrier coating layer may include at least one secondary oxide that includes at least one of an oxide of a divalent element, an oxide of a trivalent element, or an oxide of a tetravalent element. In some examples, secondary oxides that include an oxide of a divalent element, an oxide of a trivalent element, or an oxide of a tetravalent element are active components of the CMAS and/or are in relative concentrations corresponding to relative concentrations of active components of the CMAS. By selecting secondary oxides that are active components of CMAS, the reaction gradient or diffusion gradient between the CMAS components and the components of the CMAS-resistant barrier coating layer may be reduced, which may reduce penetration of active components of CMAS into and degradation of the CMAS-resistant barrier coating layer. In some examples, secondary oxides include oxides of divalent elements, oxides of trivalent elements, and oxides of tetravalent elements that act as basic or acidic oxides, such that a pH or basicity of the CMAS-resistant barrier may better match a pH or basicity of the active components of the CMAS. By selecting secondary oxides that create a basicity in the CMAS resistant barrier coating layer that better matches a pH or basicity of the CMAS, the CMAS-resistant barrier coating layer may be more stable in the presence of CMAS and less reactive with active components of the CMAS.

FIG. 1 shows a cross-sectional view of an example of an article 10 used in a high-temperature mechanical system. The article 10 includes a barrier coating 14 on a substrate 12. Barrier coating 14 includes a bond layer 16 overlying substrate 12 and a CMAS-resistant barrier coating layer 18 overlying bond layer 16.

Substrate 12 is a component of a high temperature mechanical system, such as, for example, a gas turbine engine or the like. In some examples, substrate 12 includes a superalloy, while in other examples, substrate 12 includes a ceramic or ceramic matrix composite (CMC). In examples in which substrate 12 includes a superalloy, substrate 12 may include an alloy based on Ni, Co, Ni/Fe, Ti, or the like. Substrate 12 may include other additive elements to alter its mechanical properties, such as toughness, hardness, temperature stability, corrosion resistance, oxidation resistance, and the like, as is well known in the art. Any useful superalloy may be utilized in substrate 12, including, for example, those available from Martin-Marietta Corp., Bethesda, Md., under the trade designation MAR-M247;

those available from Cannon-Muskegon Corp., Muskegon, Mich., under the trade designations CMSX-4 and CMSX-10; and the like.

In other examples, substrate 12 includes a ceramic or CMC. In some examples in which substrate 12 includes a ceramic, the ceramic may be substantially homogeneous. In some examples, a substrate 12 that includes a ceramic includes, for example, a silicon-containing ceramic, such as silica ($SiO_2$), silicon carbide (SiC) or silicon nitride ($Si_3N_4$); alumina ($Al_2O_3$); aluminosilicate; or the like. In other examples, substrate 12 includes a metal alloy that includes silicon, such as a molybdenum-silicon alloy (e.g., $MoSi_2$) or a niobium-silicon alloy (e.g., $NbSi_2$).

In examples in which substrate 12 includes a CMC, substrate 12 includes a matrix material and a reinforcement material. The matrix material includes a ceramic material, such as, for example, silicon carbide, silicon nitride, alumina, aluminosilicate, silica, or the like. The CMC further includes a continuous or discontinuous reinforcement material. For example, the reinforcement material may include discontinuous whiskers, platelets, or particulates. As other examples, the reinforcement material may include a continuous monofilament or multifilament weave.

In some examples, the composition of the reinforcement material is the same as the composition of the matrix material. For example, a matrix material comprising silicon carbide may surround a reinforcement material comprising silicon carbide whiskers. In other examples, the reinforcement material includes a different composition than the composition of the matrix material, such as aluminosilicate fibers in an alumina matrix, or the like. One composition of a substrate 12 that comprises a CMC includes a reinforcement material comprising silicon carbide continuous fibers embedded in a matrix material comprising silicon carbide.

As shown in FIG. 1, article 10 may include a bond layer 16 on substrate 12. In other examples, article 10 may omit bond layer 16. Bond layer 16 may improve adhesion between substrate 12 and the layer overlying bond layer 16 (e.g., CMAS-resistant barrier coating layer 18 in FIG. 1). Bond layer 16 may include any useful material that improves adhesion between substrate 12 and an overlying layer. For example, when substrate 12 is a superalloy, bond layer 16 may include an alloy, such as an MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-$Ni_3$Al nickel aluminide alloy (either unmodified or modified by Pt, Cr, Hf, Zr, Y, Si, and combination thereof), or the like.

In examples where substrate 12 is a ceramic or CMC, bond layer 16 may include a ceramic or another material that is compatible with substrate 12. For example, bond layer 16 may include mullite (aluminum silicate, $Al_6Si_2O_{13}$), silicon metal, silica, a silicide, or the like. Bond layer 16 may further include other elements, such as silicates of rare earth elements (i.e., a rare earth silicate) including Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), or Sc (scandium). Some preferred compositions of a bond layer 16 formed on a substrate 12 formed of a ceramic or CMC include silicon, mullite, an yttrium silicate or an ytterbium silicate.

The composition of bond layer 16 may be selected based on a number of considerations, including the chemical composition and phase constitution of substrate 12 and the layer overlying bond layer 16 (in FIG. 1, CMAS-resistant barrier coating layer 18). For example, when substrate 12 includes a superalloy with a γ-Ni+γ'-$Ni_3$Al phase constitution, bond layer 16 preferably includes a γ-Ni+γ'-$Ni_3$Al phase constitution to better match the coefficient of thermal expansion of the superalloy substrate 12. This may increase the mechanical stability (adhesion) of the bond layer 16 to the substrate 12. Alternatively, when substrate 12 includes a CMC, bond layer 16 may include silicon metal or a ceramic, for example, mullite.

In some examples, article 10 does not include bond layer 16. For example, in some examples, CMAS-resistant barrier coating layer 18 is directly on substrate 12. Article 10 may not include a bond layer 16 when CMAS-resistant barrier coating layer 18 and substrate 12 are sufficiently chemically and/or mechanically compatible. For example, in examples where CMAS-resistant barrier coating layer 18 and substrate 12 adhere sufficiently strongly to each other, article 10 may not include bond layer 16. Additionally, in examples where the coefficients of thermal expansion of substrate 12 and CMAS-resistant barrier coating layer 18 are sufficiently similar, article 10 may not include bond layer 16. In this way, CMAS-resistant barrier coating layer 18 may be on bond layer 16 or may be on substrate 12. As used herein, the terms "over" and "formed over" encompasses examples in which a first layer is directly on or formed directly on a second layer and examples in which the first layer is over or formed over the second layer, with one or more intermediate layers between the first and second layer. For example, the term "CMAS-resistant barrier coating layer 18 is over substrate 12" encompasses the following examples: CMAS-resistant barrier coating layer 18 is directly on substrate 12; CMAS-resistant barrier coating layer 18 is on bond layer 16, which is on substrate 12; and CMAS-resistant barrier coating layer 18 is on another intermediate layer between substrate 12 and CMAS-resistant barrier coating layer 18 (in addition to or instead of bond layer 16). Similarly, as use herein, the term "overlying" is analogous to "over," i.e., a first layer overlying a second layer may be directly on the second layer or may be on another layer which overlies the second layer.

Barrier coating 14 further includes CMAS-resistant barrier coating layer 18 overlying bond layer 16. CMAS-resistant barrier coating layer 18 includes a base composition and at least one secondary oxide. The base composition may include a base oxide and one or more dopants selected to provide a desired type of protection to substrate 12. For example, when substrate 12 includes a superalloy, CMAS-resistant barrier coating layer 18 may include a thermal barrier coating (TBC) composition to provide temperature resistance or thermal insulation to substrate 12, so that the temperature experienced by substrate 12 is lower than when substrate 12 is not coated with CMAS-resistant barrier coating layer 18. In other examples, when substrate 12 includes a ceramic or CMC, CMAS-resistant barrier coating layer 18 may include an environmental barrier coating (EBC) composition or an EBC/TBC bilayer or multilayer coating to provide resistance to oxidation, water vapor attack, or the like, in addition to or as an alternative to temperature resistance.

In examples in which CMAS-resistant barrier coating layer 18 includes a TBC, the base composition includes a thermally insulative material. Common TBCs include ceramic layers including zirconia or hafnia. The zirconia or hafnia TBC optionally may include one or more other elements or compounds to modify a desired characteristic of the TBC, such as, for example, phase stability, thermal conductivity, or the like. Exemplary additive elements or compounds include rare earth oxides (oxides of Lu, Yb, Tm, Er, Ho, Dy, Tb, Gd, Eu, Sm, Pm, Nd, Pr, Ce, La, Y, or Sc). Particular examples of materials from which a TBC may be formed include zirconia stabilized with between 7 weight percent (wt. %) and 8 wt. % yttria; zirconia stabilized with ytterbia, samaria, and at least one of lutetia, scandia, ceria, gadolinia, neodymia, or europia; or hafnia stabilized with ytterbia, samaria, and at least one of lutetia, scandia, ceria, gadolinia, neodymia, or europia. In some examples, CMAS-resistant barrier coating layer 18 may include zirconia and/or hafnia in combination with additive elements or compounds such that at least some of the stabilized zirconia or hafnia forms a metastable tetragonal-prime crystalline phase, a cubic crystalline phase, or a compound phase ($RE_2Zr_2O_7$ or $RE_2Hf_2O_7$, where RE is a rare earth element).

In examples in which CMAS-resistant barrier coating layer 18 includes an EBC, the base composition includes a material which reduces or substantially prevents attack of substrate 12 by chemical species present in the environment in which article 10 is utilized, e.g., in the intake gas or exhaust gas of a gas turbine engine. For example, the base composition may include a material that is resistant to oxidation or water vapor attack. Examples of EBC materials include mullite; glass ceramics such as barium strontium aluminosilicate (BaO—SrO—$Al_2O_3$—$2SiO_2$; B SAS), calcium aluminosilicate ($CaAl_2Si_2O_8$; CAS), cordierite (magnesium aluminosilicate), and lithium aluminosilicate; and rare earth silicates (silicates of Lu, Yb, Tm, Er, Ho, Dy, Tb, Gd, Eu, Sm, Pm, Nd, Pr, Ce, La, Y, or Sc). The rare earth silicate may be a rare earth mono-silicate ($RE_2SiO_5$, where RE stands for "rare earth") or a rare earth di-silicate ($RE_2Si_2O_7$, where RE stands for "rare earth"). In some examples, a CMAS-resistant barrier coating layer 18 that includes an EBC is deposited as a substantially non-porous layer, while in other examples, CMAS-resistant barrier coating layer 18 is deposited as a layer that includes a plurality of cracks. While not shown, the EBC may include an outer abradable coating.

Regardless of the composition of CMAS-resistant barrier coating layer 18 or whether CMAS-resistant barrier coating layer 18 includes a TBC composition or an EBC composition, CMAS-resistant barrier coating layer 18 may be deposited by any suitable coating fabrication technique, including, for example, plasma spraying, physical vapor deposition (PVD), chemical vapor deposition (CVD), or a slurry process. In some examples, CMAS-resistant barrier coating layer 18 may be deposited using directed vapor deposition (DVD), a type of electron beam physical vapor deposition (EB-PVD). Additionally, CMAS-resistant barrier coating layer 18 may include a substantially dense microstructure, a porous microstructure, or a columnar microstructure.

As described above, CMAS-resistant barrier coating layer 18 further includes at least one secondary oxide. The at least one secondary oxide may reduce a diffusion gradient of active components of CMAS into CMAS-resistant barrier coating layer 18, reduce a reaction gradient of active components of CMAS with CMAS-resistant barrier coating layer 18, and/or stabilize the components of CMAS-resistant barrier coating layer 18 in the presence of the active components of CMAS.

While not wishing to be bound by any particular theory, active components of CMAS include calcium oxide ("calcia", or CaO), magnesium oxide ("magnesia", or MgO), aluminum (III) oxide ("alumina", or $Al_2O_3$), and silicon oxide ("silica", or $SiO_2$). Upon forming a melt on a barrier coating, the active components may migrate into a barrier coating and react with base components of the barrier coating, such as zirconia or rare earth oxides in TBCs and monosilicates/disilicates in EBCs. The melt may cool and polymerize to form a glassy surface layer on the barrier coating. For example, basic oxides, such as CaO, MgO, $Na_2O$, and $K_2O$, may disrupt polymerization of the melt; acidic oxides, such as $SiO_2$ and $P_2O_5$, may enhance polymerization of the melt; and amphoteric oxides, such as $Al_2O_3$, $TiO_2$, and $Fe_2O_3$, may act as either acidic or basic oxides, depending on whether the melt is basic or acidic, respectively.

To counteract the diffusion and/or reaction gradients of active CMAS components into and with barrier coating 14, the at least one secondary oxide may be selected to reduce the diffusion gradients of the predicted composition of active components of CMAS into barrier coating 14 and/or reduce the reaction gradients of active components of CMAS with the base components of CMAS-resistant barrier coating layer 18. In some examples, the at least one secondary oxide may include one or more of the active components found in CMAS, which increase a concentration of the active components in CMAS-resistant barrier coating layer 18. A higher concentration of a particular active component may reduce the diffusion and reaction of similar or the same active components of CMAS. For example, for CMAS with a higher concentration of $SiO_2$ and CaO and a lower or negligible concentration of MgO and $Al_2O_3$, the CMAS-resistant barrier coating layer 18 may have concentrations of $SiO_2$ and CaO and either lower or no concentrations of MgO and $Al_2O_3$. In some examples, the relative molar concentrations of the active components in the CMAS-resistant composition may correspond to the relative molar concentrations of the active components in the CMAS. For example, for CMAS with a 40/30/20/10 calcia-magnesia-alumina-silica ratio (i.e. high basicity), CMAS resistant barrier coating layer 18 may include at least two secondary oxides in a ratio of about 40/30/20/10 of calcia, magnesia, alumina, and silica. In some examples, the relative molar concentrations of the active components in the CMAS-resistant composition may be selected for other factors, in addition to CMAS-resistance, such as coefficient of thermal expansion (CTE), thermal conductivity, crack resistance, and the like.

While the at least one secondary oxide has been described in terms of concentration and/or ratio of active components of CMAS or CMAS-resistant barrier coating layer 18, in some examples, either composition of CMAS or CMAS-resistant barrier coating layer 18 may be represented by a basicity or basicity index. A basicity index may represent a molar ratio of basic oxides to acidic oxides in the composition. Basicity index may have the following equation:

$$\text{Basicity Index} = \frac{\Sigma \text{ Basic Oxides}}{\Sigma \text{ Acidic Oxides}}$$

In the above equation, the summation of the basic oxides may include a summation of molar concentrations of basic oxides, while the summation of the acidic oxides may include a summation of molar concentrations of acidic oxides. In a CMAS composition, basic oxides may include oxides of divalent elements such as CaO and MgO, acidic oxides may include oxides of tetravalent elements such as $SiO_2$, and amphoteric oxides, which may behave as either basic or acidic, may include oxides of trivalent elements such as $Al_2O_3$. In a CMAS-resistant barrier coating layer 18, basic oxides may include oxides of divalent elements, such as CaO, BaO, and MgO; acidic oxides may include oxides of tetravalent elements such as $SiO_2$; and amphoteric oxides may include oxides of trivalent elements such as $Al_2O_3$. In some examples, the basic oxides include at least calcium oxide and the acidic oxides include at least silicon dioxide.

A basicity index of a CMAS composition may indicate a basic, acidic, or near neutral character of the CMAS composition or CMAS-resistant barrier coating layer 18. For example, a CMAS composition having a basicity index of about 2 may indicate a substantially neutral or near neutral character as, for example, a $2CaO:SiO_2$ ratio would balance charges (two $Ca^{2+}$ and one $SiO_4^{4-}$, respectively). In this regard, basicity may represent a charge-weighted balance of basic species to acidic species in a composition. A CMAS composition having a basicity index of less than 2 may have an acidic character, indicating a higher charge-weighted balance of $SiO_2$; a basicity index between 1.8 and 2.2 may have a near-neutral character, indicating a substantially equal stoichiometric concentration of CaO/MgO and $SiO_2$; and a basicity index greater than 2 may have a basic character, indicating a higher than stoichiometric concentration of CaO and/or MgO.

In some examples, the at least one secondary oxide in CMAS-resistant barrier coating layer 18 may include at least one oxide based on a predicted basicity index of the CMAS composition. For example, a CMAS composition may have a molar ratio of $4CaO:1SiO_2$, such that the predicted basicity index is about 4. Based on this basicity index of greater than 2, CMAS-resistant barrier coating layer 18 may have a higher concentration of oxides of divalent elements, such as CaO and MgO, than oxides of tetravalent elements, such as $SiO_2$. However, the CMAS-resistant composition may still include oxides of tetravalent elements, such as $SiO_2$, as inclusion of $SiO_2$ may reduce a reaction or diffusion gradient of $SiO_2$. The resulting CMAS-resistant barrier coating layer 18 may have a $SiO_2$ molar concentration of 0.5%, a CaO molar concentration of 1%, and a BaO molar concentration of 1%, for example.

In some examples, active components of CMAS may destabilize CMAS-resistant barrier coating layer 18 by reacting with components of CMAS-resistant barrier coating layer 18. For example, basic oxides of CMAS may react with base oxides, such as zirconia, or acidic oxides of a low basicity CMAS-resistant barrier coating layer 18. In some examples, active components of CMAS may destabilize CMAS-resistant barrier coating layer 18 by inducing components of the base composition to behave in an opposing basic or acidic manner and reacting with the components. For example, zirconia may act in a basic fashion with acidic CMAS and an acidic fashion with basic CMAS; in either case, the active components of CMAS may react with the zirconia.

To counteract instability of CMAS-resistant barrier coating layer 18 in the presence of CMAS, the CMAS-resistant composition may include secondary oxides that stabilize the basicity of CMAS-resistant barrier coating layer 18 against reaction with components of CMAS. In some examples, the secondary oxide composition of CMAS-resistant barrier coating layer 18 may result in a basicity that corresponds to a basicity of the CMAS. For example, a basic CMAS-resistant barrier coating layer 18 may be used in an environment with basic CMAS, or an acidic CMAS-resistant barrier coating layer 18 may be used in an environment with acidic CMAS.

In some examples, the secondary oxide composition of the CMAS-resistant barrier coating layer 18 may result in a near-neutral basicity, such as a basicity index of between about 1.8 and about 2.2. A secondary oxide composition in a near-neutral basicity may include both basic oxides and acidic oxides available to neutralize acidic or basic CMAS, respectively. In some instances, such as where a CMAS composition is not known or would include varying CMAS compositions during operation, CMAS-resistant barrier coating layer 18 may have a near-neutral basicity. For example, a neutral CMAS-resistant barrier coating layer may be used in both basic CMAS environments and acidic CMAS environments.

The secondary oxides may include one or more of oxides of divalent elements, oxides of trivalent elements, or oxides of tetravalent elements, such that a basic, acidic, or neutral behavior of CMAS-resistant barrier coating layer 18 in the presence of corresponding divalent, trivalent, and tetravalent active components of CMAS will remain constant or predictable. For example, for CMAS with a 40/30/20/10 calcia-magnesia-alumina-silica ratio (high basicity), CMAS-resistant barrier coating layer 18 may have a secondary oxide ratio of about 70/20/10 oxides of divalent elements, oxides of trivalent elements, and oxides of a tetravalent elements, respectively, to give the base composition a basic behavior in the presence of the basic CMAS.

In some examples, the at least one secondary oxide may include one or more oxides that both reduce the diffusion and reaction gradients of active components of CMAS into CMAS-resistant barrier coating layer 18 and stabilize the CMAS-resistant barrier coating layer 18 against reaction with components of CMAS. For example, the secondary oxides may be selected for both a ratio of secondary oxides corresponding to active components of the CMAS and a basicity index corresponding to a neutral basicity index or a predicted basicity index of the CMAS likely to be encountered during operation of the high temperature mechanical system.

In some examples, the secondary oxides may be selected for a particular molar fraction in CMAS-resistant barrier coating layer 18. In some examples, CMAS-resistant barrier coating layer 18 may include between about 1 molar percent (mol. %) and about 30 mol. % of at least one secondary oxide. In other examples, the CMAS-resistant barrier coating layer 18 may include between about 7 mol. % and about 15 mol. % of at least one secondary oxide. In some examples, the at least one oxide of a divalent element, oxide of a trivalent element, or oxide of a tetravalent element may be selected for a particular molar fraction in CMAS-resistant barrier coating layer 18. In some examples, CMAS-resistant barrier coating layer 18 may include greater than 0 mol. % and about 30 mol. % of at least one oxide of a divalent element, oxide of a trivalent element, or oxide of a tetravalent element.

In some examples, each of the base composition and the at least one secondary oxide may be selected for a particular molar fraction of CMAS-resistant barrier coating layer 18. CMAS-resistant barrier coating layer 18 may include a mixture or alloy of the base composition and the at least one secondary oxide. In general, CMAS-resistant barrier coating layer 18 may include between about 70 mol. % and about 99 mol. % base composition and between about 1 mol. % and about 30 mol. % of the at least one secondary oxide. In some example, CMAS-resistant barrier coating layer 18 may include between about 85 mol. % and about 93 mol. % base composition and about 7 mol. % to about 15 mol. % of the at least one secondary oxide.

In addition to oxides of divalent elements, oxides of trivalent elements, and/or oxides of tetravalent elements, the at least one secondary oxide may include an element or compound that reacts with CMAS to form a solid or a highly viscous reaction product. In some examples, the at least one secondary oxide may include at least one rare earth oxide. The at least one rare earth oxide may include an oxide of at least one of Lu, Yb, Tm, Er, Ho, Dy, Tb, Gd, Eu, Sm, Pm, Nd, Pr, Ce, La, Y, or Sc. In some examples, at least one rare earth oxide contained in the at least one secondary oxide may be the same as at least one rare earth oxide contained in the base composition. In other examples, the base composition includes at least one rare earth oxide which is different from at least one rare earth oxide in the at least one secondary oxide. In some examples, the CMAS-resistant barrier coating layer 18 is essentially free of zirconia and hafnia. That is, in these examples, CMAS-resistant barrier coating layer 18 includes at most trace amounts of zirconia and hafnia, such as, for example, the amounts present in commercially-available rare earth oxides.

In some examples, CMAS-resistant barrier coating layer 18 may optionally include at least one of $TiO_2$, $Ta_2O_5$, $HfSiO_4$, an alkali oxide, or an alkali earth oxide. The additive components may be added to CMAS-resistant barrier coating layer 18 to modify one or more desired properties of CMAS-resistant barrier coating layer 18. For example, the additive components may increase or decrease the reaction rate of CMAS-resistant barrier coating layer 18 with CMAS, may modify the viscosity of the reaction product from the reaction of CMAS and CMAS-resistant barrier coating layer 18, may increase adhesion of CMAS-resistant barrier coating layer 18 to an adjacent layer, such as bond layer 16, may increase or decrease the chemical stability of CMAS-resistant barrier coating layer 18, or the like.

As described above, in some examples, components in CMAS-resistant barrier coating layer 18 may react with CMAS that contacts CMAS-resistant barrier coating layer 18 to form a solid or highly viscous reaction product. The reaction product may have a melting temperature significantly higher than CMAS (e.g., higher than about 1200-1250° C.). A solid or highly viscous reaction product is desired because the CMAS-resistant barrier coating layer 18 is consumed as it reacts with CMAS. If, for example, the reaction product of CMAS-resistant barrier coating layer 18 and CMAS was a relatively low viscosity liquid, the low viscosity liquid could infiltrate further within pores or cracks of a porous or columnar CMAS-resistant barrier coating layer 18, which is the very occurrence the CMAS-resistant barrier coating layer 18 is designed to prevent.

If the reaction product is a solid or highly viscous, however, a reaction layer may form on or near the surface of CMAS-resistant barrier coating layer 18 (e.g., within pores or cracks in CMAS-resistant barrier coating layer 18 near the outer surface of the layer 18), which may lower the reaction rate of the CMAS with CMAS-resistant barrier coating layer 18. That is, once a solid or highly viscous reaction layer forms on or near the surface of CMAS-resistant barrier coating layer 18, the reaction between CMAS-resistant barrier coating layer 18 and CMAS may slow, because any further reaction will require the diffusion of CMAS through the reaction layer to encounter the CMAS-resistant barrier coating layer 18, or diffusion of a component of CMAS-resistant barrier coating layer 18 through the reaction layer to encounter the CMAS. In either case, the diffusion of either CMAS or the component of CMAS-resistant barrier coating layer 18 may be a limiting step in the reaction once a solid or highly viscous reaction layer is formed on the surface of CMAS-resistant barrier coating layer 18, because diffusion may be the slowest process.

CMAS-resistant barrier coating layer 18 may generally define any thickness. In some examples, CMAS-resistant barrier coating layer 18 includes a thickness of between about 0.5 mil and about 250 mils (1 mil equals 0.001 inch). In some examples, CMAS-resistant barrier coating layer 18 includes a thickness of between about 1 mil and about 20 mils.

Figure 2:
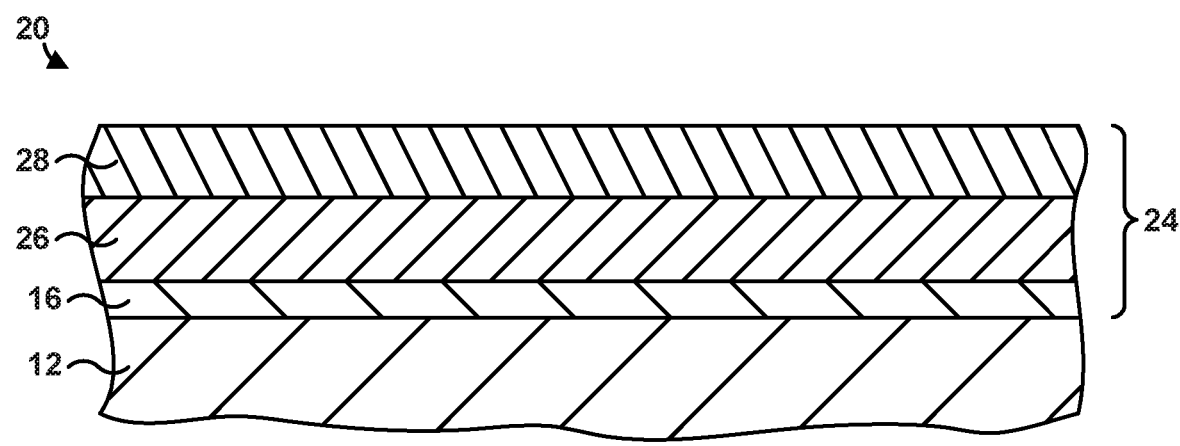
FIG. 2 is a cross-sectional diagram of an example of an article that includes a substrate coated with a barrier coating including an additional barrier coating layer.

In some examples, one or more additional barrier coating layers may be on a substrate over which CMAS-resistant barrier coating layer 18 is also on the substrate. For example, if a CMAS-resistant barrier coating layer is a TBC layer and more thermal protection is desired, an additional TBC layer may be provided between a substrate or bond layer and the CMAS-resistant barrier coating layer. FIG. 2 is a cross-sectional diagram of an example of a substrate 12 coated with a barrier coating 24 including an additional barrier coating layer 26. In contrast to FIG. 1, which shows a barrier coating 14 including a CMAS-resistant barrier coating layer 18 on a bond layer 16, article 20 of FIG. 2 includes a barrier coating 24 that includes bond layer 16 on substrate 12, a barrier coating layer 26 on bond layer 16, and a CMAS-resistant barrier coating layer 28. Substrate 12 and bond layer 16 may include similar compositions as described above with respect to FIG. 1. CMAS-resistant barrier coating layer 28 may include similar compositions as CMAS-resistant barrier coating layer 18 described in FIG. 1 above.

Barrier coating layer 26 may be selected to provide a desired type of protection to substrate 12. For example, when a substrate 12 including a superalloy is utilized, a thermal barrier coating layer may be desired to provide temperature resistance to substrate 12. A TBC layer, then, may provide thermal insulation to substrate 12 to lower the temperature experienced by substrate 12. On the other hand, when a substrate 12 including a CMC is utilized, an EBC layer or an EBC/TBC bilayer or multilayer coating may be desired to provide resistance to oxidation, water vapor attack, or the like.

A TBC layer may include any useful insulative layer. TBC layers may include ceramic layers comprising zirconia or hafnia. The zirconia or hafnia TBC layer may include other elements or compounds to modify a desired characteristic of the TBC, such as, for example, phase stability, thermal conductivity, or the like. Exemplary additive elements or compounds include, for example, rare earth oxides. The TBC may be applied by any useful technique, including, for example, plasma spraying, electron beam physical vapor deposition, chemical vapor deposition, and the like.

An EBC layer may include any useful layer which prevents environmental attack of the substrate. For example, the EBC may include materials that are resistant to oxidation or water vapor attack. Exemplary EBCs include mullite; glass ceramics such as barium strontium aluminosilicate (BaO—SrO—$Al_2O_3$—$2SiO_2$), calcium aluminosilicate ($CaAl_2Si_2O_8$), cordierite (magnesium aluminosilicate), and lithium aluminosilicate; and rare earth silicates. The EBC may be applied by any useful technique, such as plasma spraying, electron beam physical vapor deposition, chemical vapor deposition and the like.

Regardless of whether barrier coating layer 26 includes an EBC layer or a TBC layer, CMAS-resistant barrier coating layer 28 may be provided adjacent to or overlying barrier coating layer 26 to protect barrier coating layer 26 from infiltration of CMAS into the pores of barrier coating layer 26. In some examples, barrier coating layer 26 may provide a similar protection, such as environmental or thermal protection, as CMAS-resistant barrier coating layer 28. For example, a CMAS-resistant barrier coating layer 28 may provide CMAS protection and a first level of thermal protection, while barrier coating layer 26 may provide a second level of thermal protection. In some examples, barrier coating layer 26 provides a different protection as CMAS-resistant barrier coating layer 28. For example, a substrate may require both thermal protection and environmental protection. CMAS-resistant barrier coating layer 28 may be a CMAS-resistant EBC layer, while barrier coating layer 26 may be a TBC layer.

Barrier coating layer 26 may be formed to a thickness of about 0.5 mils to about 250 mils. CMAS-resistant barrier coating layer 28 may be formed to any suitable thickness such that CMAS-resistant barrier coating layer 28 provides predetermined protection to substrate 12. In examples where barrier coating layer 26 provides the same type of protection as CMAS-resistant barrier coating layer 28, such as TBC/TBC or EBC/EBC, CMAS-resistant barrier coating layer 28 may be formed to a thickness less than barrier coating layer 26, such as between about 0.5 mils and about 20 mils.

Figure 3:
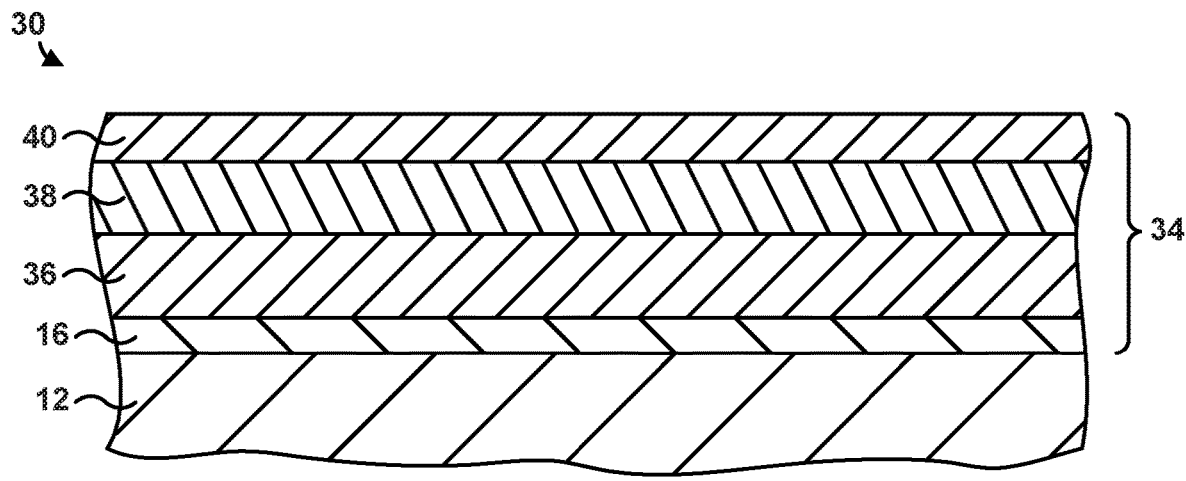
FIG. 3 is a cross-sectional diagram of an example of an article that includes a substrate coated with a multilayer barrier coating.
Figure 4:
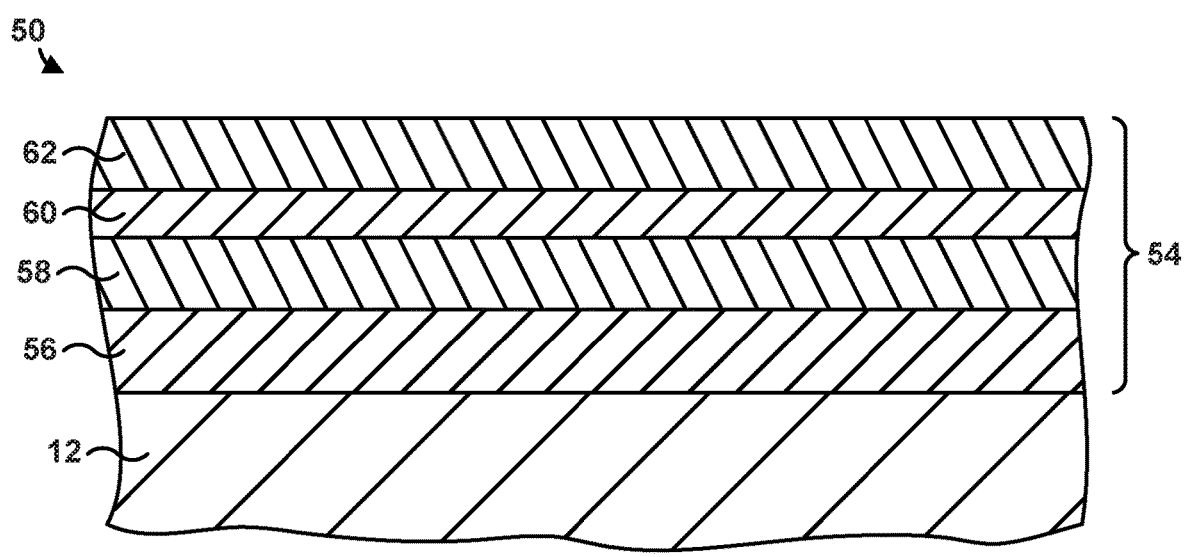
FIG. 4 is a cross-sectional diagram of an example of an article that includes a substrate coated with another multilayer barrier coating.

As shown in FIGS. 3 and 4, in some examples, a barrier coating may include additional layers. FIG. 3 is a cross-sectional diagram of an example of an article 30 having a substrate 12 coated with a multilayer barrier coating 34. Multilayer barrier coating 34 includes bond layer 16, a first barrier coating layer 36 overlying bond layer 16, a CMAS-resistant barrier coating layer 38 overlying first barrier coating layer 36, and a second barrier coating layer 40 overlying CMAS-resistant barrier coating layer 38. Substrate 12 and bond layer 16 may include similar compositions as described above with respect to FIGS. 1 and 2. Additionally, in some examples, multilayer barrier coating 34 may not include a bond layer 16, and first barrier coating layer 36 may be formed directly on substrate 12, as described above.

First barrier coating layer 36 and CMAS-resistant barrier coating layer 38 may include similar compositions as barrier coating layer 26 and CMAS-resistant barrier coating layer 28, respectively, described in FIG. 2 above. First barrier coating layer 36 may be formed to a thickness of about 0.5 mils to about 250 mils. CMAS-resistant barrier coating layer 38 may be formed to any suitable thickness such that CMAS-resistant barrier coating layer 38 provides predetermined protection to substrate 12. In some examples, CMAS-resistant barrier coating layer 38 may be formed to a thickness between about 0.5 mils and about 20 mils.

In some examples, second barrier coating layer 40 includes a similar barrier coating composition as at least one of first barrier coating layer 36 and CMAS-resistant barrier coating layer 38. In other examples, second barrier coating layer 40 includes a different barrier coating composition than at least one of first barrier coating layer 36 and CMAS-resistant barrier coating layer 38. Second barrier coating layer 40 may be formed to any predetermined thickness. In some examples, second barrier coating layer 40 may include a thickness that is less than a thickness of first barrier coating layer 36. In other examples, second barrier coating layer 40 may include a thickness which is substantially the same or ever greater than a thickness of first barrier coating layer 36. In some examples, second barrier coating layer 40 may have a thickness of between about 0.5 mils and about 250 mils.

In some examples, second barrier coating layer 40 may reduce a rate at which CMAS and CMAS-resistant barrier coating layer 38 react by reducing the rate at which CMAS comes into contact with CMAS-resistant barrier coating layer 38. Similar to a solid or highly viscous reaction layer formed on CMAS-resistant barrier coating layer 28 (described with respect to FIG. 2), second barrier coating layer 40 may function as a layer through which CMAS must pass in order to come into contact with CMAS-resistant barrier coating layer 38. This reduction in effective reaction rate may prolong the life of CMAS-resistant barrier coating layer 38 and increase the protection afforded by CMAS-resistant barrier coating layer 38 to first barrier coating layer 36 compared to an article 30 which does not include a second barrier coating layer 40. Accordingly, in some examples, the combination of the presence of second barrier coating layer 40 and the formation of a solid or highly viscous reaction product from the reaction of CMAS-resistant barrier coating layer 38 and CMAS may substantially prevent infiltration of molten CMAS in pores or cracks of first barrier coating layer 26.

Additionally or alternatively, multilayer barrier coating 34 may provide greater thermal or environmental protection to substrate 12 than a single barrier coating layer TBC or EBC, respectively, of similar composition as first barrier coating layer 36. For example, multilayer barrier coating 34 includes two interfaces between layers including two different compositions (between first barrier coating layer 36 and CMAS-resistant barrier coating layer 38, and between CMAS-resistant barrier coating layer 38 and second barrier coating layer 40). While not wishing to be bound by any particular theory, interfaces between two TBC layers having different compositions may reduce, for example, a thermal conductivity of multilayer barrier coating 34 compared to a single TBC layer having a similar composition because the interfaces between the layers provide phonon scattering points. The phonon scattering points reduce an effective thermal conductivity of the multilayer barrier coating 34 considered as a whole.

In some examples, an article may include multiple CMAS-resistant barrier coating layers, multiple other barrier coating layers, or both. For example, an article may include multiple CMAS-resistant barrier coating layers interleaved with other barrier coating layer, such as TBC layers, EBC layer, or the like. FIG. 4 is a cross-sectional diagram of an example of an article 50 that includes substrate 12 coated with a multilayer barrier coating 54 that includes multiple layers. Multilayer barrier coating 54 may include a first barrier coating layer 56, a first CMAS-resistant barrier coating layer 58, a second barrier coating layer 60, and a second CMAS-resistant barrier coating layer 62. By including multiple layers, multilayer barrier coating 54 may have different CMAS-resistant barrier coating layers configured for different CMAS conditions, such as a higher concentration of secondary oxides in second CMAS-resistant barrier coating layer 62 than first CMAS-resistant barrier coating layer 58.

Figure 5:
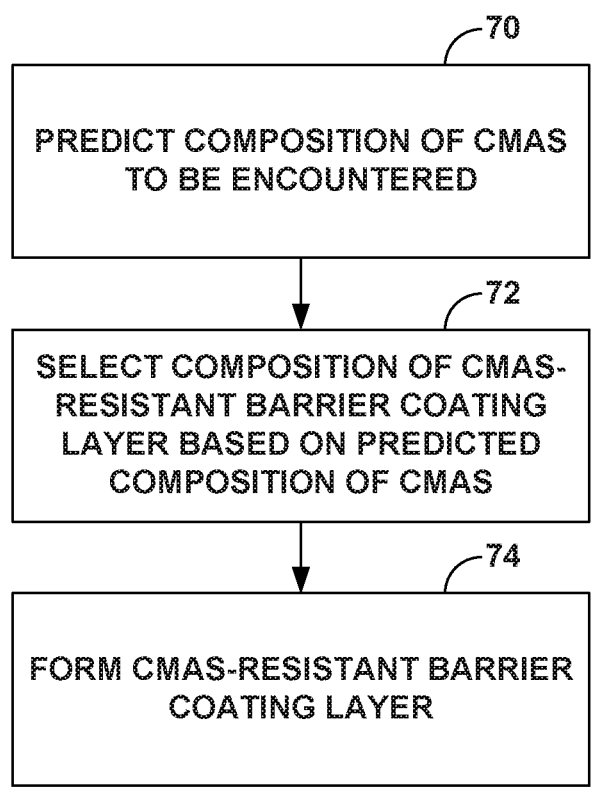
FIG. 5 is a flowchart of an example process for manufacturing a barrier coating that includes a CMAS-resistant barrier coating layer.

FIG. 5 is a flowchart of an example process for manufacturing a barrier coating that includes a CMAS-resistant barrier coating layer. A high temperature mechanical system may encounter CMAS during operation of the high temperature mechanical system. The high temperature mechanical system may include components of an aircraft engine such as turbine blades, vanes, and the like.

In some examples, a composition of CMAS to be encountered by the high temperature mechanical system may be predicted (70). The composition of the CMAS may include any concentration, fraction, ratio, percentage, index, or other relative measure of active components of the CMAS. For example, a composition of CMAS may be expressed in terms of mol. % of each active component, such as 35 mol. % CaO, 10 mol. % MgO, 7 mol. % $Al_2O_3$, and 48 mol. % $SiO_2$. In some examples, a composition of CMAS may be expressed as a basicity index, where the basicity index is a molar ratio of basic oxides to acidic oxides, as described in FIG. 1. For example, the composition of CMAS from the previous example may have a basicity index of 1.08, where the basicity index includes $Al_2O_3$, CaO, and MgO as basic oxides and $SiO_2$ as acidic oxides.

In some examples, the composition of the CMAS may be predicted by referencing CMAS composition information based on an intended geographic location of operation. For example, CMAS may originate in sand and volcanic ash, which may vary by geographic location. CMAS composition information may include a composition of CMAS for a particular geographical region. For example, sands found in Qatar may have a higher CaO content, and thus higher basicity, than sands from Bahrain, which may have a higher $SiO_2$ content, and thus lower basicity.

In some examples, a composition of a CMAS-resistant barrier coating layer may be selected based on the predicted CMAS composition (72). Selecting a composition of the CMAS-resistant barrier coating may include selecting at least one secondary oxide based on the predicted composition of CMAS. The at least one secondary oxide may include at least one oxide of a divalent element, oxide of a trivalent element, or oxide of a tetravalent element. The composition of the CMAS-resistant barrier coating layer may include any concentration, fraction, ratio, percentage, index, or other relative measure of secondary oxides in the CMAS-resistant barrier coating layer. In some examples, the secondary oxides may be selected from the active components of the CMAS, and the presence and concentration of active components in the CMAS-resistant barrier coating layer may be selected to correspond to a concentration of one or more active components of the CMAS. For example, the predicted composition of CMAS may include a relative concentration of CaO and $SiO_2$, such as 75 mol.% CaO and 25 mol.% $SiO_2$, for a basicity index of 3. The composition of the CMAS-resistant barrier coating layer may include a corresponding relative concentration of CaO and $SiO_2$. In examples where the CMAS-resistant barrier coating layer is a TBC layer, the CMAS-resistant composition may include the corresponding relative concentrations of CaO and $SiO_2$. In examples where the CMAS-resistant barrier coating layer is an EBC layer, the CMAS-resistant composition may include only CaO or a lower concentration of $SiO_2$, as $SiO_2$ may already be present in the base composition as part of the EBC layer.

In some examples, the secondary oxides may be selected such that a basicity of the CMAS-resistant barrier coating layer may correspond to a basicity of the composition of CMAS. Continuing with the previous example, the composition of the CMAS-resistant barrier coating layer may include a corresponding relative concentration of oxides of divalent elements, such as CaO and BaO, and oxides of tetravalent elements, such as $SiO_2$, so that a basicity index of the CMAS-resistant barrier coating layer is similar to the basicity index of the CMAS. In some examples, the secondary oxides may be selected such that a basicity of the CMAS-resistant barrier coating layer may be near neutral. For example, a mechanical system may be intended to operate in a variety of conditions that have a variety of predicted CMAS compositions.

In some examples, the CMAS-resistant barrier coating layer may be formed with the selected composition of the CMAS-resistant barrier coating layer (74). The CMAS-resistant barrier coating layer may be deposited by any suitable coating fabrication technique, including, for example, plasma spraying, electron beam physical vapor deposition, plasma sprayed physical vapor deposition, suspension plasma spraying, or direct vapor deposition. CMAS-resistant barrier coating layer may be formed on a bond coat layer, another barrier coating layer, or the substrate.

Various examples have been described. These and other examples are within the scope of the following claims.

What is claimed is:

1. A method comprising:
predicting a composition of active components of calcium-magnesium-aluminum-silicate (CMAS) to be encountered by a high temperature mechanical system during use of the high temperature mechanical system, wherein the composition of active components of CMAS comprises a relative molar composition of at least two of calcium oxide, magnesium oxide, aluminum oxide, or silicon oxide; and
selecting a composition of a CMAS-resistant barrier coating layer based at least in part on the predicted composition of active components of CMAS, wherein, prior to exposure of the barrier coating to an operating environment of the high temperature mechanical system, the CMAS-resistant barrier coating layer comprises:
a base composition comprising at least one of a rare earth monosilicate or a rare earth disilicate;
at least one secondary oxide selected based on the predicted composition of active components of CMAS to reduce, compared to the base composition alone, at least one of:
a diffusion gradient of the active components of CMAS into the CMAS-resistant barrier coating layer; or
a reaction gradient of the active components of CMAS with the base composition of the CMAS-resistant barrier coating layer,
wherein the at least one secondary oxide comprises at least one of an oxide of a divalent element, an oxide of a trivalent element, or an oxide of a tetravalent element,
wherein the CMAS-resistant barrier coating layer comprises greater than 0 mol. % and less than about 7 mol. % of the at least one secondary oxide, and
wherein the at least one secondary oxide includes at least one of calcium oxide, barium oxide, magnesium oxide, aluminum oxide, or silicon oxide.

2. The method of claim 1, wherein predicting the composition of active components of CMAS to be encountered comprises predicting a basicity index of CMAS, wherein the basicity index is represented by the equation:

$$\text{Basicity Index} = \frac{\Sigma \text{ mol. \% Basic Oxides}}{\Sigma \text{ mol. \% Acidic Oxides}}$$

where the basic oxides include at least calcium oxide and the acidic oxides include at least silicon dioxide.

3. The method of claim 2, wherein the predicted basicity index is less than about 2, and wherein the at least one secondary oxide comprises at least one oxide of a divalent element.

4. The method of claim 3, wherein the CMAS-resistant barrier coating layer is acidic.

5. The method of claim 2, wherein the predicted basicity index is greater than about 2, and wherein the at least one secondary oxide comprises at least one oxide of a tetravalent element.

6. The method of claim 5, wherein the CMAS-resistant barrier coating layer is basic.

7. The method of claim 2, wherein the predicted basicity index is between about 1.8 and about 2.2, and wherein the at least one secondary oxide comprises at least one oxide of a divalent element and at least one oxide of a tetravalent element.

8. The method of claim 1, wherein the CMAS-resistant barrier coating layer comprises an environmental barrier coating (EBC) layer.

9. The method of claim 1, further comprising forming the CMAS-resistant barrier coating layer over a substrate of the high temperature mechanical system using at least one of plasma spraying, electron beam physical vapor deposition, plasma sprayed physical vapor deposition, suspension plasma spraying, or direct vapor deposition.

10. The method of claim 9, further comprising forming a bond layer on the substrate, and wherein forming the CMAS-resistant barrier coating layer over the substrate comprises forming the CMAS-resistant barrier coating layer over the bond layer.

11. The method of claim 10, further comprising forming a second barrier coating layer over the substrate, and wherein forming the CMAS-resistant barrier coating layer over the substrate comprises forming the CMAS-resistant barrier coating layer over the second barrier coating layer.

12. The method of claim 1, wherein the CMAS-resistant barrier coating layer comprises a thickness between about 1 mil and about 20 mils.

13. The method of claim 1, wherein predicting the composition of active components of CMAS to be encountered comprises referencing CMAS composition information based on an intended geographical location of operation.

* * * * *